Aug. 9, 1938.　　　J. J. HOLUB　　　2,126,014
SLIP DIVIDER FOR AIR CONDUITS
Filed July 24, 1937
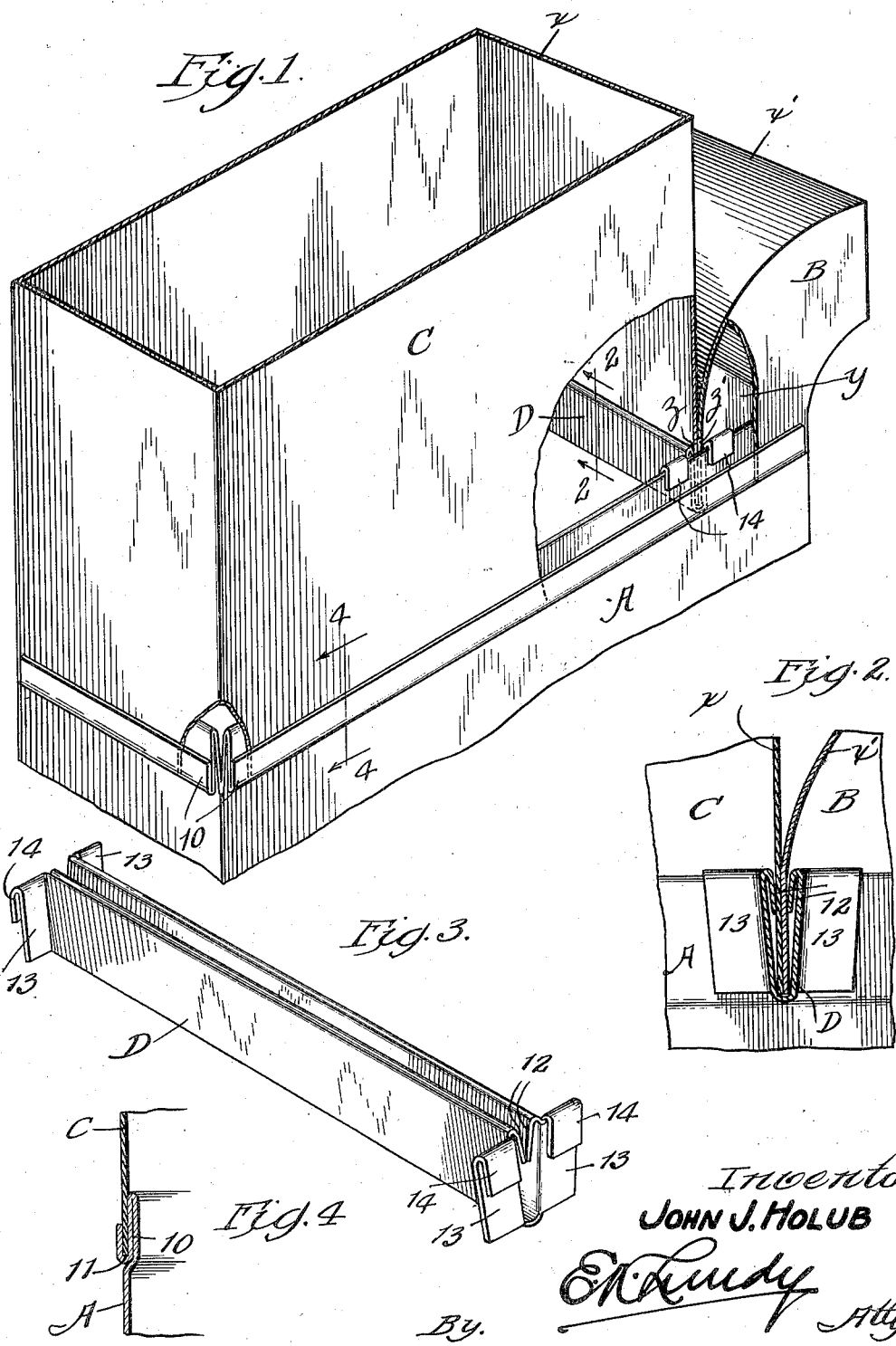
Inventor:
JOHN J. HOLUB Patented Aug. 9, 1938

2,126,014

UNITED STATES PATENT OFFICE 2,126,014

SLIP DIVIDER FOR AIR CONDUITS

John J. Holub, Cicero, Ill.

Application July 24, 1937, Serial No. 155,426

2 Claims. (Cl. 138—37)

My invention relates to conduits for conveying air or other fluids, and it has particular reference to novel means for mounting a branch on a main duct or trunk line. My present invention also pertains to a divider slip which is used in conjunction with the mounting of the branch and the reduced section upon the trunk line section of conduit.

The structure which I have disclosed is shown as installed in a conduit of rectangular cross-section, but it will be understood that the principles of my invention may be incorporated in conduits or ducts of round or other cross-sectional outlines.

Where a branch is made from a trunk line many difficulties are encountered in making the mounting and in providing an air-tight joint at the location of the branch. By means of the structure herein disclosed this inherent objection is successfully overcome. Also by using my divider or slip member the several sections of conduit or duct may be quickly assembled in a very secure manner and without the use of tools.

In devising this structure and the fitting which is incorporated therein I have numerous objects in view. One of these objects is to provide a structure of the kind described that is made of simple but sturdy parts but is nevertheless capable of withstanding severe usage. Other objects are to provide such a structure that is effective and dependable in performing its functions; which is novel in the construction and the arrangement of its parts; and which is economical to manufacture so that it may be retailed for a reasonable price. Further, objects and other advantages of this structure will be obvious to persons skilled in the art after my invention is understood from the following description.

I prefer to practice my invention, and thereby accomplish the numerous objects thereof, by means of a structure substantially as set forth in the following description and as more particularly pointed out in the appended claims. Reference is now made to the accompanying drawing that forms a part of this specification.

In the drawing:—

Figure 1 is a view in perspective, and partly broken away showing an air distributor conduit showing my invention incorporated therein.

Figure 2 is a section taken on line 2—2 of Figure 1.

Figure 3 is a view in perspective of the fitting which I have termed herein a divider member or slip.

Figure 4 is a section on line 4—4 of Figure 1.

The drawing it will be understood is more or less schematic for the purpose of illustrating a typical or preferred embodiment of my invention, and in this drawing like reference characters are used to identify the same parts wherever such parts appear in the different views.

As hereinbefore stated the conduit or distributor duct may be of any desired cross-sectional shape. For convenience I have herein illustrated such conductor as being of rectangular shape in cross-section. The trunk line or main duct is identified generally as A; the branch or elbow as B; and the reduced section of the trunk line beyond the branch is identified as C and as shown in the drawing this section C is broken away at its upper edge. The main trunk line section A embodies longitudinal and transverse walls made of sheet-metal, the oppositely disposed walls being parallel to each other, and at their end these walls are provided with S-shaped seams 10 that are formed by first bending the margins of the walls back upon themselves and then giving them a reverse bend so that a U-shaped seat 11 is provided into which the adjacent edges of three of the walls of the section C are inserted and frictionally held. Details of this seam are shown full-size in Figure 4.

The reduced trunk section C has its transverse walls of the same dimensions as the corresponding walls of the trunk line section A, but the other walls of the reduced section are shorter than the adjacent portions of the corresponding walls of section A, as will be seen in Figure 1. This decreases the cross-sectional area of said reduced section and positions its transverse wall $x$ in spaced relation to the transverse wall $y$ of the trunk line section so that the remaining space may be utilized in mounting the elbow forming the branch. For convenience in assembling the reduced trunk section C upon the trunk line section A the angular corners are slitted longitudinally as at $z$ to permit its being fitted over the seam 10.

The elbow structure forming the branch section B is preferably arcuate or segmental in shape so that it curves outwardly or laterally away from the trunk line sections in the manner shown, and it is of rectangular cross-section so that the lower edges of its walls engage with and enter the seams at the upper edges of three adjacent walls of the trunk line section. The curved wall $x'$ which extends across the open portion of trunk line section A has its lower portion straightened slightly so that after converging toward the transverse wall $x$ of the extension section C said lower straight portion is disposed against the adjacent margin of the transverse wall $x$. The lower portions of the angular corners of the branch are slitted as at $z'$ in the same manner and for the same purpose as the slits $z$ in the corners of the reduced section C.

A divider slip or bridge member D is provided for the purpose of maintaining the free edges of the walls $x$ and $x'$ in proper assembly and also for closing in any crevice or opening that may occur between the side-by-side margins of these walls. This divider slip embodies an elongated member formed of sheet-metal that is mounted upon the walls of the trunk line section A and bridges the space between opposite walls. The sheet-metal blank forming the divider or slip is folded longitudinally into a U-shape with the free marginal portions bent inward to provide facing, somewhat resilient, flanges 12 that extend down into the channel of the member D.

When mounted in proper position, the side-by-side edges of the walls $x$ and $x'$ are inserted and seated in the channel of the divider and the yielding flanges 12 urge these walls flat against each other in the manner shown in Figure 2. At its ends the divider member D has oppositely projecting lateral wings 13, and the upper portions of these wings are provided with hooks 14 that are formed by folding the metal back upon itself. These hooks engage over the adjacent edges or seams of the trunk line section A as shown in Figure 1 and thus support the divider slip or bridge member in a rigid manner.

The divider slip or bridge member D may be mounted at any location along the length of the seams 10 depending upon the relative dimensions of the reduced section C and the branch B. It will be understood that the combined cross-sectional areas of the reduced trunk section C and the branch B correspond to the cross-sectional area of the trunk line section A.

What I claim is:—

1. A slip-divider for air-conductor pipes embodying a metal strip folded upon itself intermediate its longitudinal edges to provide spaced walls forming a pocket adapted to receive a wall of an adjacent conductor pipe; lateral flanges at the ends of the walls of said pocket; and downwardly bent lips at the upper edges of said flanges, said lips adapted to be seated upon the end of a conductor pipe whereby said divider may be adjusted transversely thereof.

2. A slip-divider for air-conductor pipes embodying a metal strip folded upon itself intermediate its longitudinal edges to provide spaced walls forming a pocket adapted to receive a wall of an adjacent conductor pipe; tongues extending into the pocket from the margins of the latter and providing opposing friction members engaged with opposite faces of the conductor wall inserted in said pocket; lateral flanges at the ends of the walls of said pocket; and downwardly bent lips at the upper edges of said flanges, said lips adapted to be seated upon the end of a conductor pipe whereby said divider may be adjusted transversely thereof.

JOHN J. HOLUB.